(12) United States Patent
Cho et al.

(10) Patent No.: US 9,189,835 B2
(45) Date of Patent: Nov. 17, 2015

(54) METHOD AND APPARATUS FOR ROBUST ESTIMATION OF NON-UNIFORM MOTION BLUR

(71) Applicants: SAMSUNG ELECTRONICS CO., LTD., Suwon-si (KR); POSTECH ACADEMY-INDUSTRY FOUNDATION, Pohang-si (KR)

(72) Inventors: Jung Uk Cho, Hwaseong (KR); Seung Yong Lee, Pohang (KR); Young Su Moon, Seoul (KR); Shi Hwa Lee, Seoul (KR); Chi Young Lee, Pohang (KR); Sung Hyun Cho, Pohang (KR); Ho Jin Cho, Pohang (KR)

(73) Assignees: SAMSUNG ELECTRONICS CO., LTD., Suwon-Si (KR); POSTECH ACADEMY-INDUSTRY FOUNDATION POHANG UNIVERSITY OF SCIENCE AND TECHNOLOGY, Pohang-Si (KR)

(*) Notice: Subject to any disclaimer, the term of this patent is extended or adjusted under 35 U.S.C. 154(b) by 131 days.

(21) Appl. No.: 13/669,962

(22) Filed: Nov. 6, 2012

(65) Prior Publication Data
US 2013/0236114 A1 Sep. 12, 2013

(30) Foreign Application Priority Data
Mar. 6, 2012 (KR) .................. 10-2012-0022875

(51) Int. Cl.
G06K 9/40 (2006.01)
G06T 5/00 (2006.01)

(52) U.S. Cl.
CPC ....... G06T 5/003 (2013.01); *G06T 2207/20201* (2013.01); *G06T 2207/30168* (2013.01)

(58) Field of Classification Search
CPC .................. G06T 5/003; G06T 2207/20201; H04N 5/24264
USPC ............... 382/254, 255; 348/497; 396/55
See application file for complete search history.

(56) References Cited

U.S. PATENT DOCUMENTS 5,748,491 A    5/1998  Allison et al.
6,747,690 B2*  6/2004  Mølgaard ................. 348/208.1
(Continued)

FOREIGN PATENT DOCUMENTS

JP    2006-221347    8/2006
JP    2010-238234    10/2010
(Continued)

OTHER PUBLICATIONS

Baker et al. (Lucas-Kanade 20 years on: A unifying frame-work, International Journal of Computer Vision, 56(3), 2004, pp. 221-255).*

(Continued)

*Primary Examiner* — Yubin Hung
(74) *Attorney, Agent, or Firm* — Staas & Halsey LLP (57) ABSTRACT

A method and apparatus for robust estimation of a non-uniform motion blur that may reduce an amount of the non-uniform motion blur information, that is, a number of homographies by estimating non-uniform motion blur information about a blur in a predetermined area, thereby reducing an amount of time needed to remove the non-uniform motion blur, and may improve accuracy and stability of the non-uniform motion blur information by estimating homographies for an input image while increasing a number of the homographies, iteratively.

21 Claims, 7 Drawing Sheets

(56) References Cited

U.S. PATENT DOCUMENTS

| | | | |
|---|---|---|---|
| 8,411,980 B1* | 4/2013 | Wang et al. | 382/254 |
| 8,446,468 B1* | 5/2013 | Medioni et al. | 348/144 |
| 2004/0212699 A1* | 10/2004 | Molgaard | 348/231.99 |
| 2006/0098237 A1 | 5/2006 | Steinberg et al. | |
| 2006/0101106 A1 | 5/2006 | Subbarao | |
| 2006/0119710 A1 | 6/2006 | Ben-Ezra et al. | |
| 2006/0152950 A1* | 7/2006 | Reddy et al. | 363/39 |
| 2006/0187308 A1* | 8/2006 | Lim et al. | 348/208.4 |
| 2007/0217713 A1 | 9/2007 | Milanfar et al. | |
| 2008/0025627 A1* | 1/2008 | Freeman et al. | 382/255 |
| 2008/0100716 A1* | 5/2008 | Fu et al. | 348/208.8 |
| 2008/0151064 A1* | 6/2008 | Saito et al. | 348/208.4 |
| 2008/0225127 A1* | 9/2008 | Ming | 348/208.99 |
| 2008/0246848 A1* | 10/2008 | Tsubaki et al. | 348/208.4 |
| 2008/0253676 A1* | 10/2008 | Oh et al. | 382/255 |
| 2009/0123082 A1* | 5/2009 | Atanssov et al. | 382/236 |
| 2010/0209009 A1* | 8/2010 | Matsunaga | 382/224 |
| 2010/0214423 A1* | 8/2010 | Ogawa | 348/208.4 |
| 2010/0231732 A1 | 9/2010 | Baxansky et al. | |
| 2010/0329582 A1* | 12/2010 | Albu et al. | 382/255 |
| 2011/0299793 A1* | 12/2011 | Miura et al. | 382/275 |
| 2012/0121202 A1* | 5/2012 | Wang et al. | 382/255 |
| 2012/0284012 A1* | 11/2012 | Rodriguez et al. | 704/1 |
| 2013/0242129 A1* | 9/2013 | Harmeling et al. | 348/222.1 |

FOREIGN PATENT DOCUMENTS

| | | |
|---|---|---|
| KR | 10-0860967 | 9/2008 |
| KR | 10-2010-0034145 | 4/2010 |
| KR | 10-2010-0085539 | 7/2010 |
| KR | 10-2011-0022544 | 3/2011 |
| KR | 10-2011-0043991 | 4/2011 |
| KR | 10-2011-0056098 | 5/2011 |

OTHER PUBLICATIONS

Whyte et al. ("Non-uniform deblurring for shaken images," IEEE Conf. on Computer Vision and Pattern Recognition, Jun. 13-18, 2010, pp. 491-498).*

Fergus et al. ("Removing Camera Shake from a Single Photograph," ACM Trans. Graphics 25, 787-794).*

Yuan et al. ("Image deblurring with blurred/noisy image pairs," ACM SIGGRAPH 2007).*

Fan et al. ("Image motion estimation from blurred and noisy image sequences," Proceedings 1998 International Conference on Image Processing).*

* cited by examiner

METHOD AND APPARATUS FOR ROBUST ESTIMATION OF NON-UNIFORM MOTION BLUR

CROSS-REFERENCE TO RELATED APPLICATIONS

This application claims the priority benefit of Korean Patent Application No. 10-2012-0022875, filed on Mar. 6, 2012, in the Korean Intellectual Property Office, the disclosure of which is incorporated herein by reference.

BACKGROUND

1. Field

Example embodiments of the following disclosure relate to a method and apparatus for robust estimation of a non-uniform motion blur, and more particularly, to a method and apparatus for estimation of non-uniform motion blur from an image by estimating homographies iteratively.

2. Description of the Related Art

A blur is a phenomenon which commonly occurs during a process of obtaining an image while using an apparatus for obtaining an image, such as, a camera, and the like. The blur phenomenon is one of the main contributors to deterioration of image quality.

When an image is obtained using the apparatus for obtaining an image in an environment where an amount of light is insufficient, for example, a dark indoor location or an outdoor location in the evening, a sufficient amount of light is required to obtain a clear image. Accordingly, an image sensor may be exposed to light for a longer period of time than usual in order to obtain the sufficient amount of light. However, when an exposure time is too long, a blur may occur in the obtained image due to the image sensor being shaken during the period of time that the image sensor is exposed to light.

Removing a blur from an image may be difficult since an amount of information required may be greater than an amount of information provided. In particular, each pixel of an image generally includes a non-uniform motion blur in different directions and of different sizes due to a translational motion and a rotational motion of a camera.

Accordingly, a method and apparatus for robust estimation of non-uniform motion blur is needed.

SUMMARY

The foregoing and/or other aspects are achieved by providing a method of estimating a non-uniform motion blur, the method including receiving an input image including a non-uniform motion blur, estimating non-uniform motion blur information about a blur, included in the non-uniform motion blur, in a predetermined area included in the input image, and obtaining a latent image by removing the non-uniform motion blur from the input image, based on the estimated non-uniform motion blur information.

The estimating of the non-uniform motion blur information may include estimating homographies for the input image, and estimating the non-uniform motion blur information by matching the homographies to the blur in the predetermined area.

The estimating of the non-uniform motion blur information may include estimating at least two homographies for the input image and a homography between the at least two homographies, iteratively.

The method may further include normalizing weights for the homographies, using the at least two homographies and the homography between the at least two homographies.

The method may further include performing the estimating of the non-uniform motion blur information and the obtaining of the latent image, iteratively.

The performing may include terminating an iterative performance of the estimating of the non-uniform motion blur information and the obtaining of the latent image, based on a change in an error value with respect to a homography set including the estimated homographies.

The method may further include restoring a final image from the input image, based on obtained final non-uniform motion blur information when the iterative performance is completed.

The input image may correspond to at least one of a single frame including the non-uniform motion blur, a multi-frame including the non-uniform motion blur, and a multi-frame including a single blurred image including the non-uniform motion blur and a single noise image without a blur.

The foregoing and/or other aspects are achieved by providing an apparatus for estimating a non-uniform motion blur, the apparatus including a receiving unit to receive an input image comprising a non-uniform motion blur, an estimating unit to estimate non-uniform motion blur information about a blur in a predetermined area included in the input image, and an obtaining unit to obtain a latent image by removing the non-uniform motion blur from the input image, based on the estimated non-uniform motion blur information.

The estimating unit may include a first estimator to estimate homographies for the input image, and a second estimator to estimate the non-uniform motion blur information by matching the homographies to the blur in the predetermined area.

The estimating unit may estimate at least two homographies for the input image and a homography between the at least two homographies, iteratively.

The apparatus may include a weight normalizing unit to normalize weights for the homographies, using the at least two homographies and the homography between the at least two homographies.

The apparatus may include an iterative performance unit to perform estimation of the non-uniform motion blur information and obtaining of the latent image, iteratively.

The iterative performance unit may complete an iterative performance of the estimation of the non-uniform motion blur information and the obtaining of the latent image, based on a change in an error value with respect to a homography set including the estimated homographies.

The apparatus may include a restoring unit to restore a final image from the input image, based on obtained final non-uniform motion blur information when the iterative performance is completed.

The input image may correspond to at least one of a single frame including the non-uniform motion blur, a multi-frame including the non-uniform motion blur, and a multi-frame including a single blurred image including the non-uniform motion blur and a single noise image without a blur.

The foregoing and/or other aspects of the present disclosure are achieved by providing a method for robust estimation of a non-uniform motion blur, the method including: estimating, by a processor, homographies of an input image, the estimated homographies comprising a homography set; iteratively increasing a number of estimated homographies in the homography set; and obtaining a final image of the input image using the estimated homographies, based on a change of an error value of the homography set.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
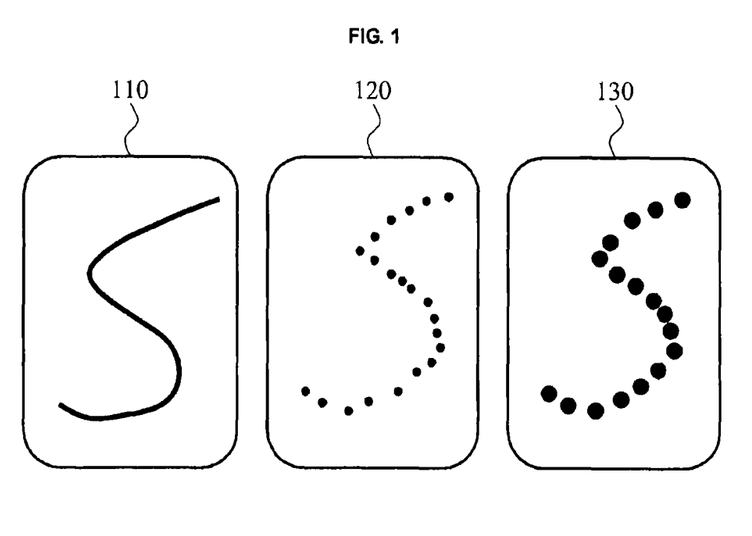
FIG. 1 illustrates a comparison between a general motion blur model and motion blur models, according to example embodiments.

FIG. 1 illustrates a comparison between a general motion blur model and motion blur models, according to example embodiments.

Referring to FIG. 1, a difference between the general motion blur model and the motion blur models according to example embodiments can be understood.

When it is assumed that a motion blur or a trace of a camera being shaken while the image sensor is exposed to light appears as shown in 110, then 120 may indicate an approximate motion blur estimated using a blur model of Equation 3, and 130 may indicate an approximate motion blur estimated using a blur model of Equation 7.

Generally, a motion blur may be expressed by Equation 1.

$$B = K*L + N,\quad \text{[Equation 1]}$$

where B denotes a blurred image, and K denotes a point spread function (PSF) or a motion blur kernel indicating blur information of an image. L denotes a latent image, that is, a clear image without a blur. N denotes an unknown noise occurring during a process of obtaining an image, and * denotes a convolution operator.

Equation 1 may be expressed by Equation 2 in a vectorial form.

$$b = \sum_i w_i T_i l + n, \quad \text{[Equation 2]}$$

where b, l, and n denote vector expressions of B, L, and N of Equation 1. $T_i$ denotes a determinant representing a translational motion of a camera at a point in time $t_i$, and $w_i$ denotes a relative length of time when the camera stops at the point in time $t_i$, that is, an exposure time of the camera at the point in time $t_i$. Here, $\Sigma_i w_i = 1$.

Equation 2 may indicate that the blurred image B may be expressed using a sum of latent images L at each point on a route of the camera, that is, the determinant Ti. Here, Equation 1 and Equation 2 may express an identical model in different manners.

The latent images L may be computed using a motion blur model of Equation 1 or Equation 2. In this instance, since a blur model for estimating a latent image may assume that all pixels included in an image may be uniformly moved, it may be difficult to remove a non-uniform motion blur occurring due to a rotational motion, rather than a translational motion of a camera.

Accordingly, a non-uniform motion blur model describing a non-uniform motion blur effect of a camera may be derived by substituting $T_i$ of Equation 2 with a homography $P_i$, as expressed by Equation 3.

$$b = \sum_i w_i P_i l + n \quad \text{[Equation 3]}$$

where b, l, and n denote vector expressions of the blurred image B, the latent image L, and the unknown noise N, respectively. $P_i$ denotes a matrix representing a projective transform motion of the camera at the point in time $t_i$, and $w_i$ denotes a relative length of time when the camera stops at the point in time $t_i$, that is, an exposure time of the camera at the point in time $t_i$. Here, $\Sigma_i w_i = 1$.

Equation 3 may indicate that the blurred image B may be expressed using a sum of latent images L at each coordinate and each viewpoint on a route of the camera.

In methods of dealing with a non-uniform motion blur, when the blurred image B and the latent image L being currently estimated are provided, a process of estimating a non-uniform motion blur that may exist in the blurred image B by comparing the blurred image B and the latent image L may be of significant importance. A method of estimating the non-uniform motion blur will be described hereinafter.

The method of estimating the non-uniform motion blur may include two operations, that is, estimation of a homography and estimation of a weight. When the blurred image B and the latent image L are provided, the non-uniform motion blur may be estimated by performing the two operations iteratively.

With respect to the estimation of the homography, each homography may be estimated using Equation 4, which is modified from Equation 3.

$$b - \sum_{j \neq i} w_j P_j l = w_i P_i l + n \quad \text{[Equation 4]}$$

In order to compute a single homography $P_i$ in Equation 4, an image registration algorithm that may reduce a difference between $$b - \sum_{j \neq i} w_j P_j l$$

of the left side and $w_i P_i l$ of the right side may be applied. An entire homography set P may be obtained by computing every $P_i$ while changing an index i of each homography $P_i$, in Equation 4.

When the entire homography set P is computed, a weight w of a homography may be computed using the computed homography set P.

With respect to computing the weight w, Equation 3 may be expressed as Equation 5.

$$b = Aw + n, \quad \text{[Equation 5]}$$

where $A = [P_1 1 \, P_2 1 \ldots P_n 1]$, and A corresponds to an m-by-n (m×n) matrix. Here, m denotes a number of pixels included in an image, and n denotes a number of homographies.

Generally, m>>n, and the weight w in Equation 5 may need to have a value greater than or equal to 0. Accordingly, a non-negative least square method may be used.

In order to use the non-negative least square method, the weight w may be computed using Equation 6, expressed in a form of a normal equation.

$$w = (A^T A + \beta I)^{-1} A^T b, \quad \text{[Equation 6]}$$

where β denotes a normalized parameter to be used for resolving a case in which an inverse matrix of a determinant in parenthesis is absent. I denotes an identity matrix.

The method of estimating the homography and the method of estimating the weight may be used in common for a blur model that may be assumed in an input image corresponding to a multi-frame including a non-uniform motion blur or a multi-frame including a blurred image and a noise image.

However, in Equation 3, since every motion of the camera may be defined using each homography, the greater the camera movement, the greater the number of homographies may be required to describe the motion of the camera. Accordingly, a considerable amount time may be used for a process of estimating and removing the non-uniform motion blur.

Generally, in order to estimate a non-uniform motion blur, M homographies may be assumed, and the M homographies may be estimated sequentially one by one. Although this example embodiment estimates homographies sequentially one by one, the present disclosure is not limited thereto. In a process of estimating a homography $P_i$, when another homography $P_j$ has a wrong value, it may be likely to estimate a wrong value for the homography $P_i$ as well, and the non-uniform motion blur may be estimated inaccurately. In addition, a weight $w_i$ of each homography may be estimated after the M homographies are estimated. In this instance, when a great number of homographies have similar values, estimation of the weight $w_i$ may become unstable. Consequently, the process of estimating the non-uniform motion blur may become unstable.

According to example embodiments, a blur model, for example, a non-uniform motion blur model, differing from the model of Equation 3 may be used to remove the non-uniform motion blur using a relatively small number of homographies. Also, in order to increase stability in the process of estimating the non-uniform motion blur, the process of estimating the non-uniform motion blur may be performed while progressively increasing a number of homographies starting with a small number of homographies, for example, starting with at least two homographies.

In Equation 3, each homography may correspond to a single point of each PSF of Equation 1. Equation 3 may be modified to Equation 7 to derive a new blur model.

$$b = \sum_i w_i (P_i G) l + n, \quad \text{[Equation 7]}$$

where G denotes an operator indicating a blur component in a small area. For example, the Gaussian blur operator may be used.

$(P_i G)$ in Equation 7 may correspond to a blur component of a size of an area corresponding to a blur in a small area, as opposed to the signal point of each PSF of Equation 1. Accordingly, Equation 7 may be used to express an identical blur using a fewer number of homographies, when compared to Equation 3. Also, a latent image L may be down-sampled by the Gaussian blur operation G, and thus, the blur may be estimated faster.

In order to increase the stability of the operation of estimating the non-uniform motion blur, the process of progressively increasing a number of homographies starting with a small number of homographies in the operation of estimating the non-uniform motion blur will be described. When a latent image L and a blurred image B are provided as inputs, only two homographies may be estimated at first, for example. Although this example embodiment estimates two homographies at first, the present disclosure is not limited thereto.

Each of the two homographies may be estimated using Equation 8 that is modified from Equation 7.

$$b - \sum_{j \neq i} w_j P_j Gl = w_i P_i Gl + n \quad \text{[Equation 8]}$$

A homography $P_i$ that may reduce a difference between $$b - \sum_{j \neq i} w_j P_j Gl$$

of the left side and $w_i P_i Gl$ of the right side may be computed using an image registration algorithm.

An entire homography set P may be obtained by computing every $P_i$ while changing an index i of each homography $P_i$, in Equation 8. Also, by iterating the process of computing every $P_i$ while changing the index i, the entire homography set P may be improved progressively. In this instance, the foregoing process may be performed iteratively within a predetermined number of times until a reduction in an error value of the homography set P is less than a predetermined reference value.

An error in the homography set P may be defined as expressed by Equation 9.

$$E = \sqrt{\frac{1}{N_{pixels}} \left\| b - \sum_i w_i P_i Gl \right\|^2}, \quad \text{[Equation 9]}$$

where $N_{pixels}$ denotes a number of pixels in an image.

After the two homographies are estimated using Equation 8, another homography connecting the two homographies may be added. In this instance, the added homography and a weight of the added homography may be computed as expressed by Equation 10 and Equation 11, respectively.

$$P' = 0.5P_1 + 0.5P_2 \quad \text{[Equation 10]}$$

$$w' = 0.5w_1 + 0.5w_2 \quad \text{[Equation 11]}$$

Here, the added homography P' and the weight w' of the added homography P' may be arranged between $P_1$ and $P_2$. That is, a new homography set may be defined as $P^{new} = \{P_1, P', P_2\} = \{P_1^{new}, P_2^{new}, P_3^{new}\}$, and a new weight set may be defined as $w^{new} = \{w_1, w', w_2\} = \{w_1^{new}, w_2^{new}, w_3^{new}\}$.

After the homography is added using Equation 10 and Equation 11, a sum of weights of all homographies may be greater than '1.' Accordingly, in order to make the sum of the all weights be '1,' the weights may be normalized using Equation 12.

$$W_i^{normalized} \leftarrow \frac{w_i^{new}}{\sum_j w_j^{new}} \quad \text{[Equation 12]}$$

The three homographies, that is, $P_1^{new}, P_2^{new}, P_3^{new}$ may be improved using Equation 8, discussed earlier. After the three homographies are estimated, a homography connecting $P_1$ and $P_2$ and a homography connecting $P_2$ and $P_3$ may be added, and the foregoing process may be iterated. When the estimation of the three homographies is completed, still another homography may be added, and the foregoing process may be iterated, in an identical manner. The iterative process may be performed until a reduction in the error value, as defined in Equation 9, is less than a predetermined reference value.

When the estimation is started using a small number of homographies, stable estimation may be possible since estimation of a homography $P_i$ may be affected by another homography relatively less when compared to estimation being started using a great number of homographies. Also, since the number of homographies may be increased sequentially one by one from the small number of homographies until an error is reduced, such that the reduction of the error value is less than a predetermined reference value, the number of homographies may be computed automatically, absent a need for predetermining a number of required homographies.

Figure 2:
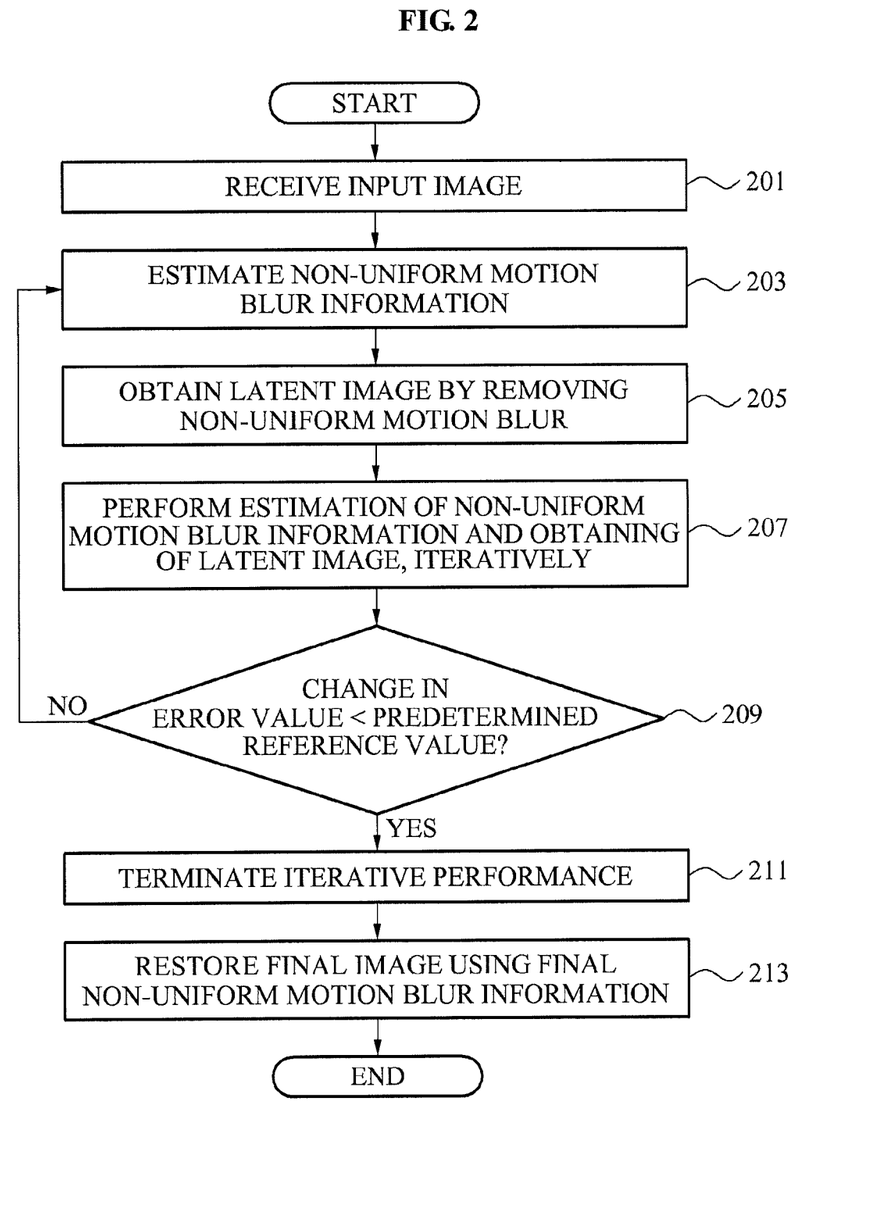
FIG. 2 illustrates a flowchart for a method of estimating a non-uniform motion blur, according to example embodiments.

FIG. 2 illustrates a method of estimating a non-uniform motion blur, according to example embodiments.

In operation 201, an apparatus for estimating a non-uniform motion blur, hereinafter referred to as an estimation apparatus, may receive an input image including a non-uniform motion blur.

In operation 203, the estimation apparatus may estimate non-uniform motion blur information about a blur, included in the non-uniform motion blur, in a predetermined area of the input image. In particular, the estimation apparatus may estimate homographies for the input image, and may estimate the non-uniform motion blur information by matching the homographies to the blur in the predetermined area. In this instance, the estimation apparatus may progressively increase a number of estimated homographies by estimating at least two homographies for the input image and a homography between the at least two homographies, iteratively.

Here, a method of progressively increasing the number of estimated homographies will be further described with reference to FIG. 4.

Also, the estimation apparatus may normalize weights for the homographies using the at least two homographies and the homography between the at least two homographies.

In operation 205, the estimation apparatus may obtain a latent image L by removing the non-uniform motion blur from the input image, based on the estimated non-uniform motion blur information.

In operation 207, the estimation unit may perform the operation 203 of estimating the non-uniform motion blur information and the operation 205 of obtaining the latent image L, iteratively.

In operation 209, the estimation unit may determine whether a change in an error value with respect to a homography set including the estimated homographies is less than a predetermined reference value, during the iterative performance.

When the change in the error value is less than the predetermined reference value in 209, the estimation apparatus may determine that the input image may be improved, and may terminate or complete the iterative performance in operation 211.

Conversely, when the change in the error value is greater than or equal to the reference value in 209, the estimation apparatus may determine that the input image may be greatly improved by the iterative performance, and may continue performing the operations 203 through 207.

In operation 213, the estimation apparatus may restore a final image from the input image, using obtained final non-uniform motion blur information when the iterative performance is completed.

Here, the input image may correspond to at least one of a single frame including the non-uniform motion blur, a multi-frame including the non-uniform motion blur, and a multi-frame including a single blurred image including the non-uniform motion blur and a single noise image without a blur.

A method of removing a non-uniform motion blur using the method of estimating the non-uniform motion blur when the input image corresponds to the multi-frame including the non-uniform motion blur will be described with reference to FIG. 5. Also, a method of removing a non-uniform motion blur using the method of estimating the non-uniform motion blur when the input image corresponds to the multi-frame including the single blurred image and the single noise image will be described with reference to FIG. 6.

Figure 3:
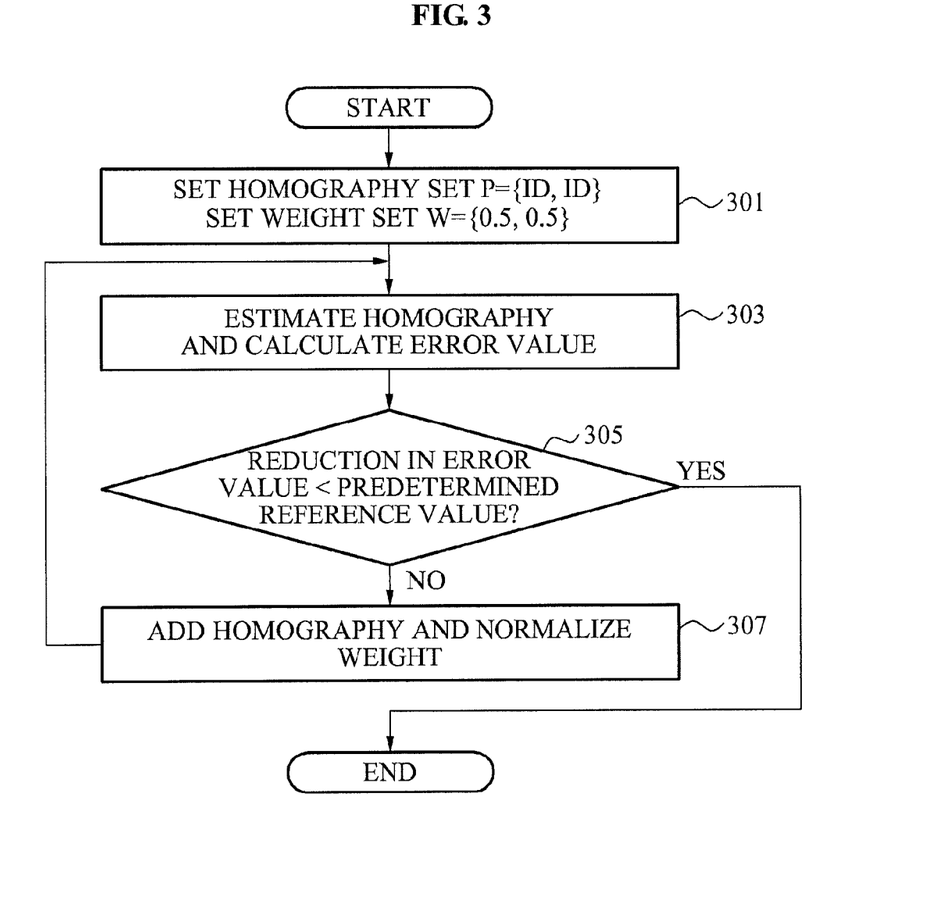
FIG. 3 illustrates a flowchart for a process of estimating homographies when estimating non-uniform motion blur information, according to example embodiments.

FIG. 3 illustrates a process of estimating homographies when estimating non-uniform motion blur information, according to example embodiments.

In operation 203 of FIG. 2, each homography may be estimated using image registration. Referring to FIG. 3, an estimation apparatus may set a homography set of P={Id, Id} and a weight set of w={0.5, 0.5}, in operation 301.

In operation 303, the estimation apparatus may estimate homographies for an input image, and calculate an error value for each of the estimated homographies. In this instance, the estimation apparatus may estimate non-uniform motion blur information by matching the homographies to a blur in a predetermined area of the input image.

At first, the estimation apparatus may estimate at least two homographies for the input image, and a homography between the at least two homographies, iteratively.

In operation 305, the estimation apparatus may determine whether a reduction in the error value, from operation 303, is less than a predetermined reference value. Here, the predetermined reference value may refer to a predetermined value at which an error value is determined to be scarcely reduced. In this instance, when the reduction in the error value for the estimated homography is determined to be greater than or equal to the predetermined reference value, the estimation apparatus may obtain at least two homographies and an additional homography between the at least two homographies. In operation 307, the estimation apparatus may normalize weights for the homographies, that is, the homography set, using the at least two homographies and the additional homography. That is, the estimation apparatus may return to the operation 303, and may perform the process of estimating the homography.

Conversely, in operation 305, when the reduction in the error value for the homography is determined to be less than the predetermined reference value, the estimation apparatus may complete the operation. That is, the estimation apparatus may terminate the iterative operation when the error value for the estimated homography is reduced, such that the reduction in the error value is less than a predetermined reference value.

Figure 4:
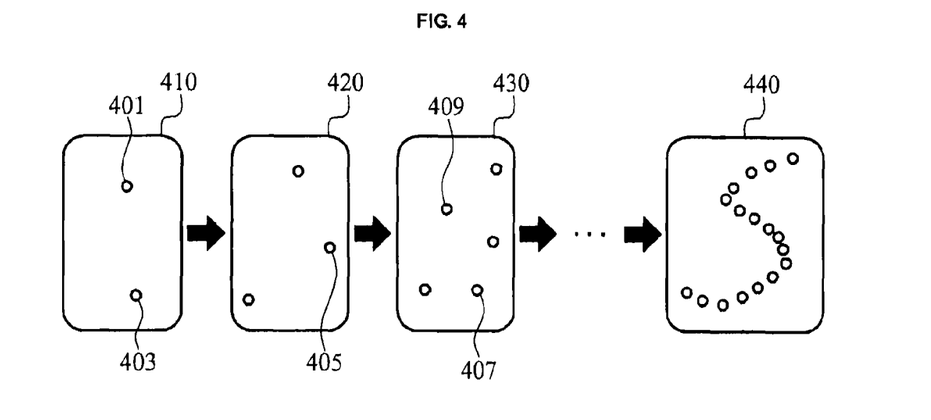
FIG. 4 illustrates a method of progressively increasing a number of homographies to be estimated by a method of estimating a non-uniform motion blur, according to example embodiments.

FIG. 4 illustrates a method of progressively increasing a number of homographies to be estimated by a method of estimating a non-uniform motion blur, according to example embodiments.

That is, FIG. 4 illustrates a method of progressively adding a homography in the operation 307 of FIG. 3.

In operation 410, two homographies 401 and 403 may be estimated at first. In operation 420, a new homography 405 connecting the two homographies 401 and 403 may be added, and a non-uniform motion blur estimated.

After a non-uniform motion blur is estimated using the three homographies 401, 403, and 405, a new homography 407 connecting the homographies 403 and 405 and a new homography 409 connecting the homographies 401 and 405 may be added and the non-uniform motion blur may be estimated, in operation 430. Using the foregoing process, the non-uniform motion blur may be estimated while increasing sequentially one by one a number of the homographies in operation 440, until the reduction in the error value of the set of homographies is less than a predetermined reference value.

Figure 5:
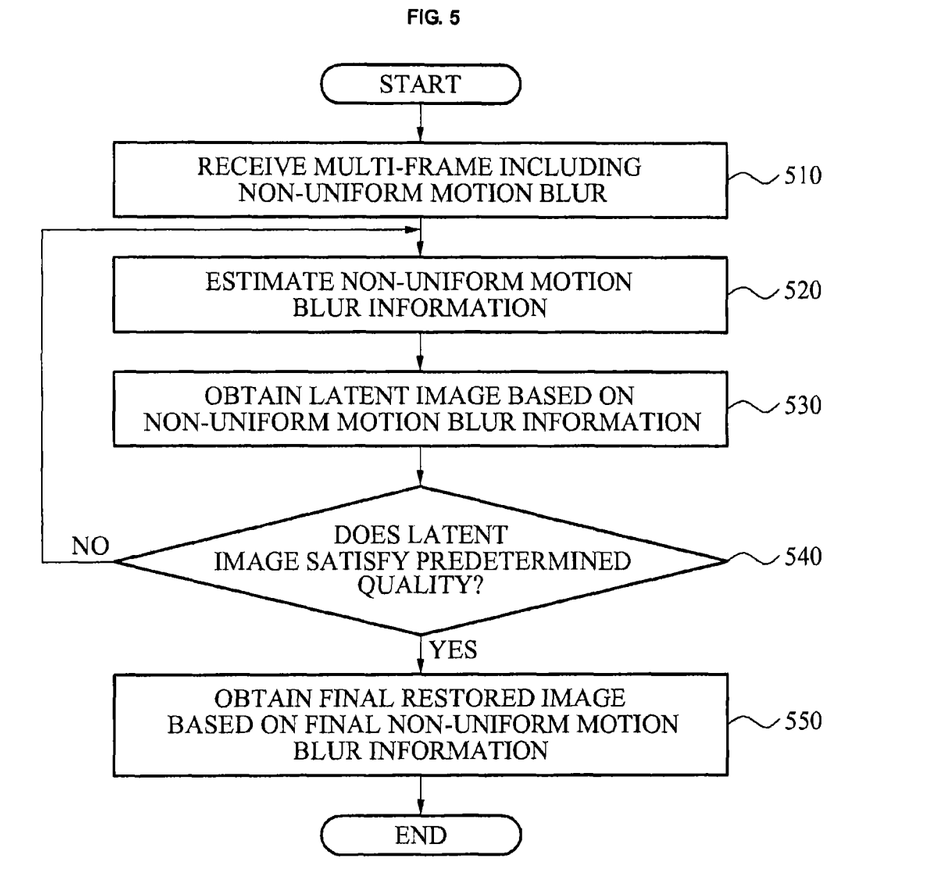
FIG. 5 illustrates a flowchart for a method of removing a non-uniform motion blur based on a multi-frame, by a method of estimating a non-uniform motion blur, according to example embodiments.

FIG. 5 illustrates a flowchart for a method of removing a non-uniform motion blur based on a multi-frame, by a method of estimating a non-uniform motion blur according to example embodiments.

Referring to FIG. 5, multiple pieces of images, that is, a multi-frame, including a non-uniform motion blur may be received in operation 510. In operation 520, non-uniform motion blur information about each blurred image including a non-uniform motion blur may be estimated using a method of estimating a non-uniform motion blur.

In operation 530, a latent image L may be obtained by removing the non-uniform motion blur from the multi-frame, based on the estimated non-uniform motion blur information. In operation 540, whether the obtained latent image L satisfies a predetermined quality may be determined. When the obtained latent image L fails to satisfy the predetermined quality, the non-uniform motion blur information may be re-estimated, that is, updated, based on the obtained latent image L, and the latent image L may be updated based on the updated non-uniform motion blur information.

Conversely, when the obtained latent image L satisfies the predetermined quality in operation 540, a final image may be restored from the multi-frame, based on the non-uniform motion blur information or updated final non-uniform motion blur information, in operation 550.

Figure 6:
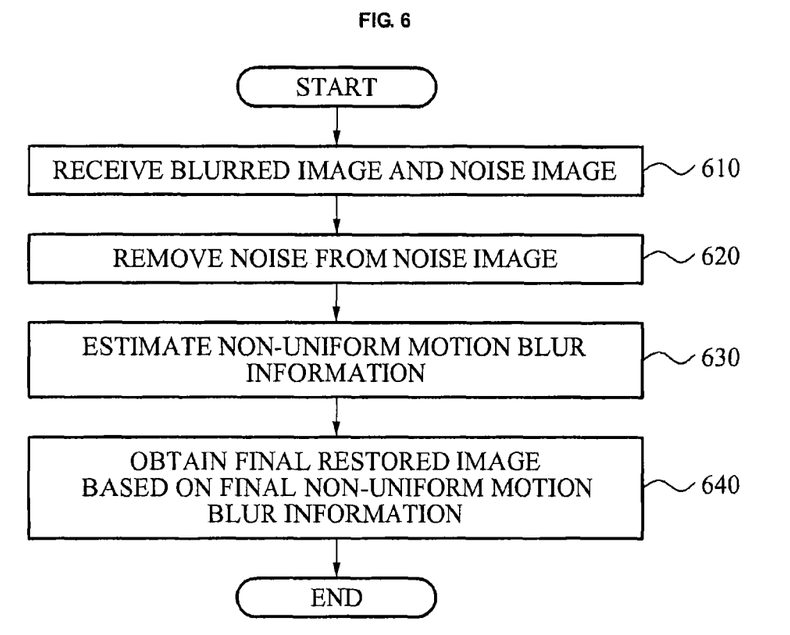
FIG. 6 illustrates a flowchart for a method of removing a non-uniform motion blur based on a noise image and a blurred image, by a method of estimating a non-uniform motion blur, according to example embodiments.

FIG. 6 illustrates a flowchart for a method of removing a non-uniform motion blur based on a noise image and a blurred image, by a method of estimating a non-uniform motion blur according to example embodiments.

Referring to FIG. 6, a blurred image including a non-uniform motion blur and a noise image without a blur may be received in operation 610.

Noise may be removed from the noise image in operation 620, and non-uniform motion blur information about the blurred image may be estimated, using the noise image from which the noise is removed, and the blurred image, in operation 630.

In operation 640, a final restored image may be obtained using the obtained final non-uniform motion blur information.

Figure 7:
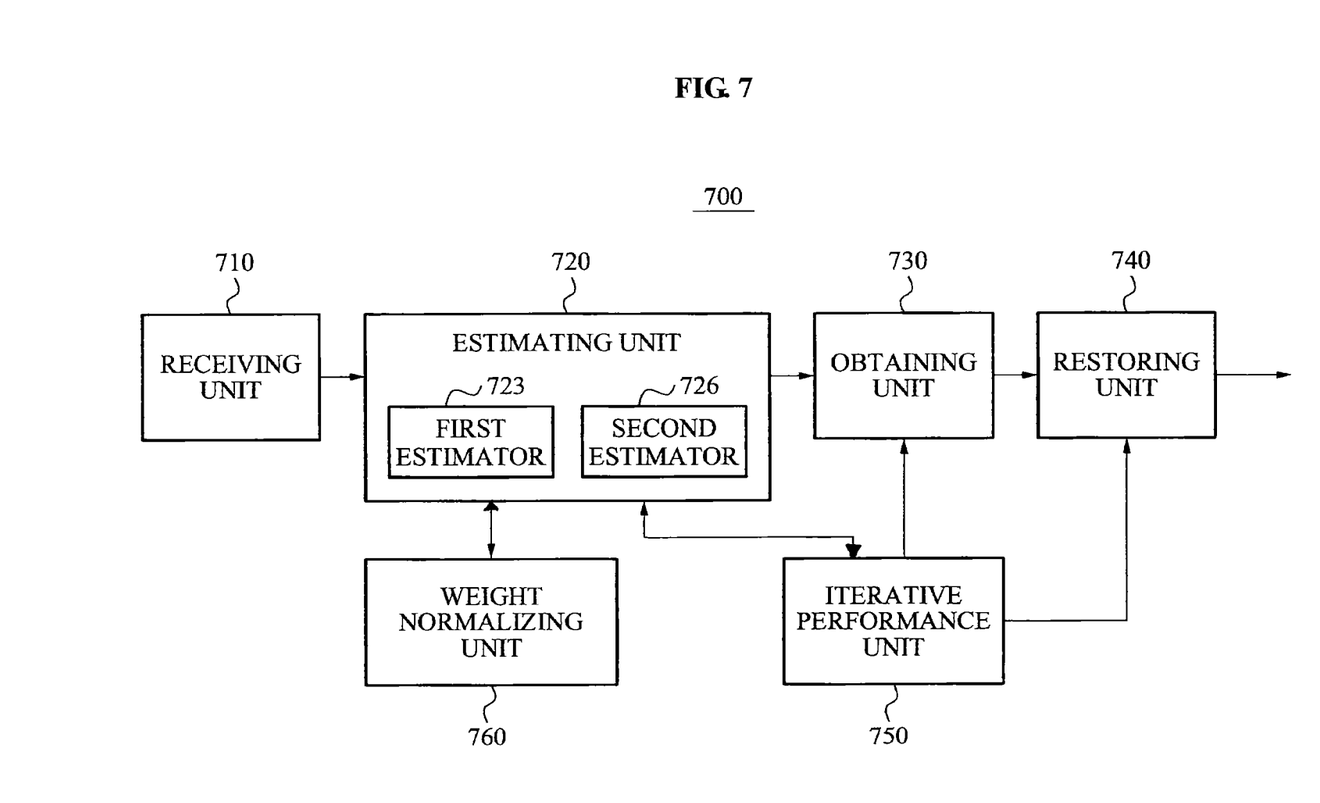
FIG. 7 illustrates an apparatus for estimating a non-uniform motion blur, according to example embodiments.

FIG. 7 illustrates a block diagram of an apparatus 700 for estimating a non-uniform motion blur according to example embodiments.

Referring to FIG. 7, the apparatus 700 may include a receiving unit 710, an estimating unit 720, and an obtaining unit 730. Other example embodiments of the apparatus 700 may further include a restoring unit 740, an iterative performance unit 750, and a weight normalizing unit 760.

The receiving unit 710 may receive an input image including a non-uniform motion blur. The input image may correspond to at least one of a single frame including the non-uniform motion blur, a multi-frame including the non-uniform motion blur, and a multi-frame including a single blurred image including the non-uniform motion blur and a single noise image without a blur.

The estimating unit 720 may estimate non-uniform motion blur information about a blur in a predetermined area included in the input image. The estimating unit 720 may include a first estimator 723, and a second estimator 726.

The first estimator 723 may estimate homographies for the input image, and the second estimator 726 may estimate non-uniform motion blur information by matching the homographies to the blur in the predetermined area.

Also, the estimating unit 720 may estimate at least two homographies for the input image, and a homography between the at least two homographies, iteratively.

The obtaining unit 730 may obtain a latent image L by removing the non-uniform motion blur from the input image, based on the estimated non-uniform motion blur information.

The restoring unit 740 may restore a final image from the input image, using the obtained final non-uniform motion blur information when the iterative performance has completed.

The iterative performance unit 750 may perform estimation of the non-uniform motion blur information and obtaining of the latent image, iteratively. Also, the iterative performance unit 750 may complete the iterative performance of the estimation of the non-uniform motion blur information and the obtaining of the latent image, based on a change in an error value with respect to a homography set including the estimated homographies.

That is, when the change in the error value with respect to the homography set is lower than a predetermined reference level, the iterative performance unit 750 may determine that the input image may be improved, and may complete the iterative performance.

The weight normalizing unit 760 may normalize weights for the homographies, using the at least two homographies and the homography between the at least two homographies.

According to example embodiments, by estimating non-uniform motion blur information about a blur in a predetermined area, an amount of the non-uniform motion blur information, that is, a number of homographies, may be reduced, and thus, the amount of time needed to remove a non-uniform motion blur may be reduced.

According to example embodiments, by estimating homographies for an input image while increasing a number of the homographies, accuracy and stability of non-uniform motion blur information may be improved.

The methods according to the above-described embodiments may be recorded in non-transitory computer-readable media including program instructions to implement various operations embodied by a computer, including a processor. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. The described hardware devices may be configured to act as one or more software modules in order to perform the operations of the above-described embodiments, or vice versa.

Further, according to an aspect of the embodiments, any combinations of the described features, functions and/or operations can be provided.

Moreover, the apparatus for estimating a non-uniform blur may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of estimating a non-uniform motion blur, the method comprising:
receiving an input image comprising a non-uniform motion blur;
estimating homographies for the received input image, the estimated homographies comprising a homograph set;
iteratively increasing a number of estimated homographies in the homography set; and
obtaining a latent image based on a change of an error value of the homography set.

2. The method of claim 1, wherein the iteratively increasing of the number of the estimated homographies further comprises adding a homography based on the estimated homographies, and estimating the added homography, iteratively.

3. The method of claim 1, wherein the iteratively increasing of the number of the estimated homographies comprises progressively increasing the number of the estimated homographies when a reduction of the error value with respect to the homography set including the estimated homographies is greater than or equal to a predetermined reference value.

4. The method of claim 1, wherein the obtaining of the latent image comprises:
performing the estimating of the non-uniform motion blur information corresponding to the homography set and the obtaining of the latent image based on the non-uniform motion blur information, iteratively.

5. The method of claim 4, wherein the obtaining of the latent image further comprises terminating an iterative performance of the estimating of the non-uniform motion blur information and the obtaining of the latent image, based on the change of the error value with respect to the homography set.

6. The method of claim 4, wherein iterative performance of the estimating of the non-uniform motion blur information and the obtaining of the latent image is completed when a reduction of the error value with respect to the homography set is less than a predetermined reference value.

7. The method of claim 4, wherein the obtaining of the latent image further comprises:
restoring a final image from the received input image, based on obtained final non-uniform motion blur information when the iterative performance has completed.

8. The method of claim 1, wherein the received input image corresponds to at least one of a single frame comprising the non-uniform motion blur, a multi-frame comprising the non-uniform motion blur, and a multi-frame comprising a single blurred image comprising the non-uniform motion blur and a single noise image without the blur.

9. The method of claim 1, further comprising determining whether the obtained latent image satisfies a predetermined quality, and re-estimating the non-uniform motion blur information, based on the determining.

10. The method of claim 1, wherein the estimating of the homographies comprises estimating at least two homographies for the received input image, and
wherein the iteratively increasing of the number of the estimated homographies comprises adding a homography between the at least two homographies.

11. The method of claim 10, wherein the iteratively increasing of the number of the estimated homographies further comprising:
normalizing weights for the estimated homographies, using the estimated at least two homographies and the homography between the at least two homographies.

12. A method for robust estimation of a non-uniform motion blur, the method comprising:
calculating, by a processor, homographies of an input image, the calculated homographies comprising a homography set;
iteratively increasing a number of calculated homographies in the homography set; and
obtaining a final image of the input image using the calculated homographies, based on a change of an error value of the homography set.

13. A non-transitory computer-readable medium comprising a program for instructing a computer to perform the method of claim 1.

14. An apparatus for estimating a non-uniform motion blur, the apparatus comprising:
a processor to control one or more processor-executable units;
a receiving unit to receive an input image comprising a non-uniform motion blur;
an estimating unit to
estimate homographies for the received input image, the estimated homographies comprising a homography set, and
iteratively increasing a number of estimated homographies in the homography set; and
an obtaining unit to obtain a latent image based on a change of an error value of the homography set.

15. The apparatus of claim 14, wherein the estimating unit is configured to add a homography based on the estimated homographies and estimate the added homography, iteratively.

16. The apparatus of claim 14, wherein the obtaining unit is configured to perform estimation of the non-uniform motion blur information corresponding to the homography set and obtaining of the latent image based on the non-uniform motion blur information, iteratively.

17. The apparatus of claim 16, wherein the obtaining unit is further configured to complete an iterative performance of the estimation of the non-uniform motion blur information and the obtaining of the latent image, based on the change of the error value with respect to the homography set.

18. The apparatus of claim 14, wherein the obtaining unit is configured to restore a final image from the received input image, based on obtained final non-uniform motion blur information when an iterative performance is completed.

19. The apparatus of claim 14, wherein the input image corresponds to at least one of a single frame comprising the non-uniform motion blur, a multi-frame comprising the non-uniform motion blur, and a multi-frame comprising a single blurred image comprising the non-uniform motion blur and a single noise image without the blur.

20. The apparatus of claim 14, wherein the estimating unit is configured to estimate at least two homographies for the received input image, and add a homography between the at least two homographies.

21. The apparatus of claim 20, further comprising:
a weight normalizing unit to normalize weights for the estimated homographies, using the estimated at least two homographies and the homography between the at least two homographies.

\* \* \* \* \*